United States Patent
Sasaki et al.

(10) Patent No.: US 6,298,374 B1
(45) Date of Patent: Oct. 2, 2001

(54) COMMUNICATION MANAGEMENT APPARATUS WITH USER MODIFIABLE SYMBOL MOVABLE AMONG VIRTUAL SPACES SHARED BY USER TERMINALS TO DIRECT CURRENT USER POSITION IN REAL WORLD AND RECORDING MEDIUM USED THEREFOR

(75) Inventors: Kazuo Sasaki; Akihiko Obata, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/044,980

(22) Filed: Mar. 20, 1998

(30) Foreign Application Priority Data

Nov. 19, 1997 (JP) .................................................. 9-318713

(51) Int. Cl.⁷ ..................................................... G06F 15/16
(52) U.S. Cl. ........................... 709/204; 709/205; 709/223; 345/330; 345/331
(58) Field of Search ..................................... 709/200–206, 709/223–224; 707/10, 104; 345/326, 329–332, 355

(56) References Cited

U.S. PATENT DOCUMENTS

| 5,491,743 | * | 2/1996 | Shiio et al. ........................... 709/204 |
| 5,659,691 | * | 8/1997 | Durward et al. ...................... 709/204 |
| 5,736,982 | * | 4/1998 | Suzuki et al. ........................ 345/330 |
| 5,894,307 | * | 4/1999 | Ohno et al. .......................... 345/355 |
| 6,006,460 | * | 12/1999 | Waters et al. ........................ 709/205 |
| 6,009,254 | * | 12/1999 | Ohno et al. .......................... 709/204 |
| 6,012,102 | * | 1/2000 | Shachar ............................... 709/223 |

FOREIGN PATENT DOCUMENTS

| 8-181084 | 7/1996 | (JP) ............................... H01L/21/60 |
| 8-191089 | 7/1996 | (JP) ............................... H01L/21/66 |

* cited by examiner

Primary Examiner—Bharat Barot
(74) Attorney, Agent, or Firm—Staas & Halsey LLP

(57) ABSTRACT

A communication management apparatus and recording medium which manages positions in the real world in connection with virtual spaces in a virtual world that correspond to these positions; which makes, while maintaining a substitute join either of the virtual spaces of the virtual world, the substitute in the virtual world move to follow the physical movement of a communicating person who moved to another place; and which displays the destination of the substitute of the communicating person in the virtual world or the destination of the communicating person in the real world, whereby a communicating person who wishes to communicate with another person physically moved, is able to know the destination of the substitute which moved in the virtual world to follow the physical movement of the other person, or the physical movement destination of the other person and is also able to communicate with the other person through designating the substitute of the other person who physically moved as the partner for communication by using a communication terminal apparatus at the destination, by monitoring either with his own communication terminal apparatus joining conditions of substitutes in the virtual world or by monitoring a screen of the communication terminal apparatus of the other person after moving thereto.

30 Claims, 8 Drawing Sheets

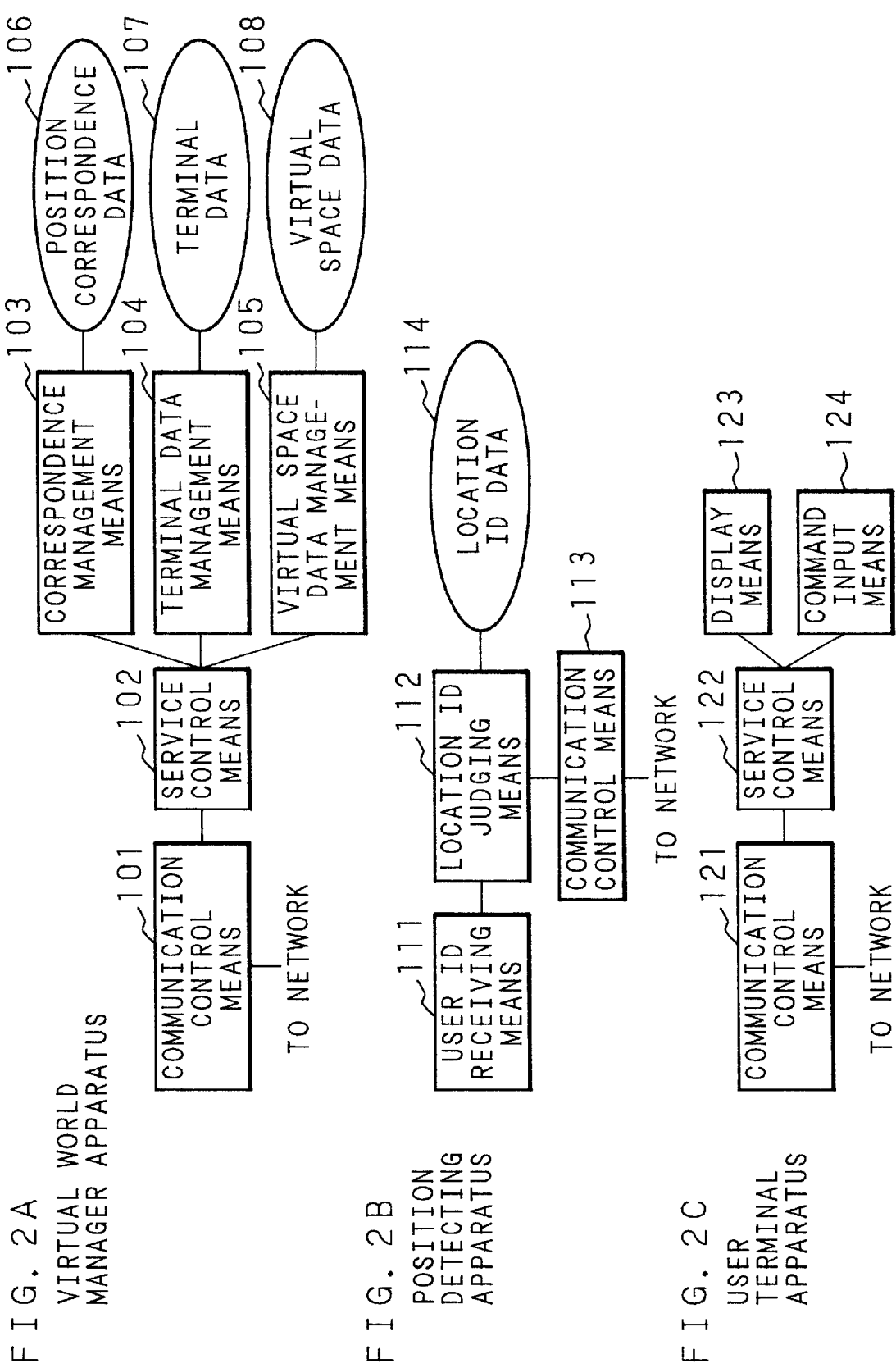

COMMUNICATION MANAGEMENT APPARATUS WITH USER MODIFIABLE SYMBOL MOVABLE AMONG VIRTUAL SPACES SHARED BY USER TERMINALS TO DIRECT CURRENT USER POSITION IN REAL WORLD AND RECORDING MEDIUM USED THEREFOR

BACKGROUND OF THE INVENTION

The present invention relates to a communication management apparatus such as a personal computer which makes a movement of a symbol in a virtual world follow a movement of a user in the real world through a communication system in which the virtual world having a plurality of virtual spaces is constructed on a network, and the symbol of the user is operated to move from one virtual space to another virtual space. The system enables exchange of messages between users who make their symbols join the same virtual space, and the present invention also relates to a recording medium which can be read by this apparatus.

It is proposed for a communication management apparatus to manage users joining a virtual world through "substitutes" in a communication system which provides a service in that users operate from a user terminal apparatus connected to a network a symbol as a substitute of the user expressed by CG (computer graphics) or a picture to move between a plurality of virtual spaces such as structures or rooms which compose the virtual world (city, building, etc.) constructed on the network, and to enable conversations by means of speech or text through their substitutes between a plurality of user terminal apparatuses in which the respective substitutes join the same virtual space (Japanese Patent Application Laid-Open Nos. 8-191084, 8-191089).

In a conventional communication system, as long as a substitute of a user is present in the virtual world, that is, during a period between log-in and log-out such service as described above, another user may require communication to imagine the user corresponding to the substitute is present in front of the user terminal apparatus.

However, despite the presence of the substitute in the virtual world, the user may be away from the user terminal apparatus so that another user can not obtain any response from the user corresponding to this substitute when requiring communication of the substitute, and no messages can be exchanged.

Therefore, in circumstances where the user needs to move between several places during a period of log-in to the service described above such cases may often occur that messages can not be exchanged with a user corresponding to a substitute although it is present in the virtual world. Moreover, even if the user moved to a proximity of another terminal apparatus and is able to exchange messages, there are no means provided to know the destination to which the user moved.

BRIEF SUMMARY OF THE INVENTION

The present invention has been made to solve the above problems, and it is an object of the present invention to provide a communication management apparatus and recording medium readable by the apparatus in which a user who wishes to communicate with a partner who physically moved can know the destination of the substitute of the partner in the virtual world following a physical movement of the partner or the destination of the partner who physically moved through simply monitoring a joining state of the substitutes in the virtual world with his or her own communication terminal apparatus or through moving to a communication terminal apparatus of the partner to monitor its screen, and further the user can communicate with the partner with a communication terminal apparatus at the movement destination of the partner when designating the substitute of the partner who physically moved as a communication partner, by managing a position in the real world and a virtual space in a virtual world that corresponds to this position to link each other, by moving a substitute in the virtual world in linkage with a physical movement of the user to another position while the user is making the substitute join either of the virtual spaces of the virtual world, and by displaying a destination of the substitute of the user in the virtual world or a destination of the user in the real world.

In the present invention, data specifying a virtual space such as a virtual space name and identification data such as a symbol name of a user who makes the symbol join the virtual space are managed, and further positions in the real world and data specifying virtual spaces corresponding to these positions are managed to link each other, a position of a communicating person in the real world is detected, and when the communicating person moves to another position in the real world, the symbol of the communicating person is moved to a virtual space corresponding to the position.

With this arrangement, the symbol for the substitute of the user moves to the virtual space corresponding to the destination of the user following the physical movement of the user.

Further, in the present invention, in case a position of a symbol in the virtual world is moved following a movement of a communicating person in the real world, information on the destination of the communicating person is displayed on a communicating terminal apparatus at the default position of the symbol of this communicating person.

With this arrangement, a user who wishes to communicate with a partner who physically moved needs only to move to a communicating terminal apparatus at the default position at which the partner is usually present and to monitor its screen to know the destination of the partner to which he or she physically moved or a virtual destination of the partner, that is, the destination of the symbol of the partner.

Further, in the present invention, controlled positions in the real world at which a plurality of communication terminal apparatuses are positioned respectively and data for respectively identifying the communication terminal apparatuses are managed to link each other, and in case a symbol which is moved in the virtual world following a movement of a communicating person in the real world is required to exchange messages by another symbol, a communication is required of a communication terminal apparatus disposed at a position in the real world which corresponds to the virtual space of the destination of the symbol.

With this arrangement, communication with a partner is enabled by using a communication terminal apparatus at the destination of the partner by designating the substitute of the partner who physically moved.

Further, in the present invention, when a position of a symbol in the virtual world is moved following a movement of a communicating person in the real world, this symbol is displayed on a terminal apparatus disposed in the real world at the position which corresponds to the virtual space to which the symbol moved.

With this arrangement, a user who physically moved can use a communicating terminal apparatus disposed at the destination of the user to operate a symbol of a substitute of the user to join the virtual world and exchange messages with other users.

Further, in the present invention, a symbol which is moved through an operation and a symbol which is moved following a movement of a communicating person in the real world are displayed on the communicating terminal apparatus in different display styles, for example, by changing their colors or the like.

With this arrangement, a user who wishes to communicate with a partner who physically moved is able to know whether the partner physically moved or not by simply monitoring a joining state of the symbol of the substitute of the partner in the virtual world on the user's communication terminal apparatus.

Further, in the present invention, when a second symbol is made to join the default virtual space where a symbol which moved to another virtual space joined, information on a destination of the first symbol (e.g. virtual space name) is made to be displayed in characters or the like on the image of this virtual space.

With this arrangement, a user who wishes to communicate with a partner who physically moved is able to know the destination of the image of the substitute of the partner in the virtual world by simply monitoring a joining state of the symbol of the substitute of the partner in the default virtual space of the partner on the user's communication terminal apparatus.

The above and further objects and features of the invention will more fully be apparent from the following detailed description with accompanying drawings.

BRIEF DESCRIPTION OF THE SEVERAL VIEWS OF THE DRAWING

FIGS. 2A to 2C are block diagrams of portions of the communication system of FIG. 1;

DETAILED DESCRIPTION OF THE INVENTION

Figure 1:
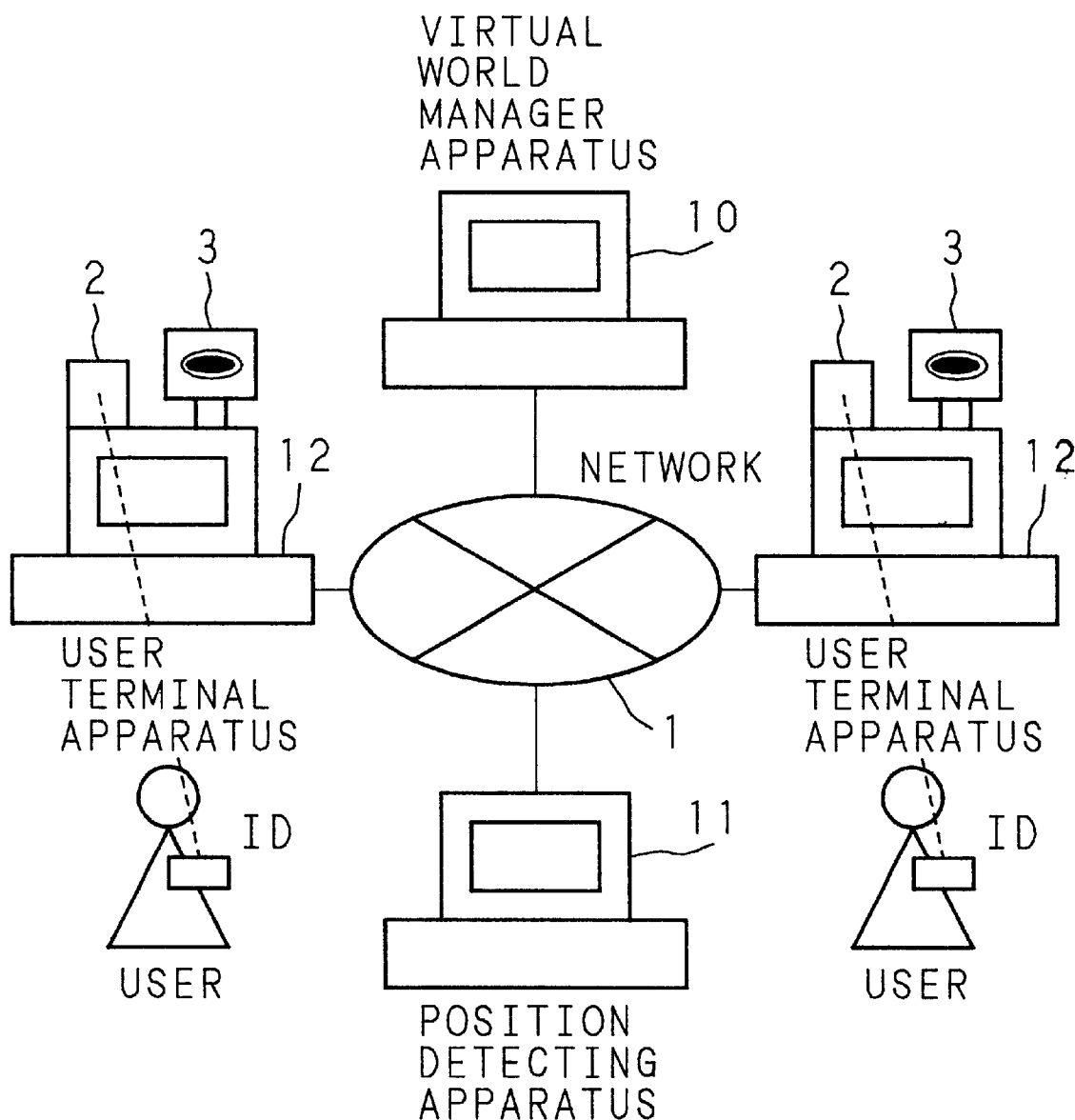
FIG. 1 is a schematic diagram of a communication system for realizing the present invention.

FIG. 1 is a schematic diagram of a communication system for realizing the present invention.

In the drawing, numeral 1 denotes a network on which a virtual world having a plurality of virtual spaces which correspond to the real world, such as structures having a plurality of rooms is constructed, and the network 1 provides a message exchange service for users between user terminal apparatuses that join the virtual world.

There are connected to the network 1 a plurality of personal computers as user terminal apparatuses 12 with each of which a user operates a symbol as a substitute of the user expressed by a picture or CG to join the virtual world on the network 1.

In the proximity of the user terminal apparatus 12 (in this example, on the top of the personal computer), there are disposed a sensor 2 such as an infrared sensor for reading a user ID from an ID card owned by the user and a camera 3 for photographing the proximity of the user terminal apparatus 12, either successively or intermittently.

There is also connected to the network 1 a personal computer as a position detecting apparatus 11 for detecting a physical position of a destination of the user, and the position detecting apparatus 11 sends out a requirement command to the user terminal apparatus 12 every specified time, to make the user terminal apparatus 12 transmit the user ID read by the sensor 2 together with an apparatus ID of the user terminal apparatus 12, and in case the user terminal apparatus 12 identified by the apparatus ID is not the terminal apparatus of the user identified by the user ID, it is judged that the user has physically moved and the physical position of the destination of the user is detected.

Further, there is also connected to the network 1 a personal computer as a virtual world manager apparatus 10 for managing data on positions in the real world and spaces in the virtual world, apparatus IDs and physical positions of user terminal apparatuses 12, images of virtual spaces composing the virtual world, and symbols of users that are joining communication; for moving, in linkage with a movement of the user in the real world, the position of the symbol of the user in the virtual world based on data of the position of the user detected by the position detecting apparatus 11; and for managing data which indicates that the user moves own symbol by using the user terminal apparatus 11.

The virtual world manager apparatus 10 sends out a requirement command to the user terminal apparatus 12 to take in images photographed by the camera 3 at a specified timing, e.g. when the user joins the virtual world, when the user moves the symbol in the virtual world, or when the position detecting apparatus 11 detects a movement of a user in the real world, and makes the apparatus 12 transmit these image data together with an apparatus ID of the user terminal apparatus 12 to create an image of a substitute in which the user is symbolized, whereupon it is transmitted to other user terminal apparatuses 12 joining the same virtual world to display the image.

In case CG is used instead of the camera 3, corresponding CG may be read based on the read user ID and displayed.

In this embodiment, the above-mentioned virtual world manager apparatus 10, position detecting apparatus 11 and sensor 2 compose the communication management apparatus of the present invention.

Although in this embodiment, the virtual world manager apparatus 10 and position detecting apparatus 11 are individual personal computers, they may be arranged in one personal computer.

FIG. 2 is a block diagram of portions of the communication system of FIG. 1, wherein FIG. 2A is a block diagram of the virtual world manager apparatus 10, FIG. 2B of the position detecting apparatus 11, and FIG. 2C of the user terminal apparatus 12.

The virtual world manager apparatus 10 comprises a communication control means 101 for controlling transmission of data through the network 1; a service control means 102 for selecting services upon requirement from the network 1; a correspondence management means 103 which stores, as position correspondence data 106, positions in the real world and virtual space names that correspond to these positions relating each other, for retrieving from among the position correspondence data 106 a virtual space that corresponds to a position of a destination of the user sent from the position detecting apparatus 11; and a terminal data management means 104 which stores, as terminal data 107, apparatus IDs of user terminal apparatuses 12 and positions in the real world in which the respective apparatuses are disposed, for managing the relationship between these.

The virtual world manager apparatus 10 further comprises a virtual space data management means 105 which stores virtual space data 108 such as the default virtual space names of substitutes of users and virtual space names of the latest destinations of the substitutes by user IDs, images of virtual spaces by virtual space names, and images of substitutes of users joining the virtual space together with corresponding user IDs, for updating the virtual space name of the destination to a virtual space name corresponding to the physical destination of the user each time the user moves to another position in the real world, or for transmitting an image of the substitute to user terminal apparatuses 12 that make their symbols join the same virtual space to make the apparatuses 12 additionally display the image each time a substitute is newly made to join the virtual space.

The service control means 102 of the virtual world manager apparatus 10 sends an instruction to the user terminal apparatus 12 to display on a display means 123 an image of a substitute that moved in the virtual world following a movement of the user in the real world and an image of a substitute that moved in the virtual world through an operation of the user in different display styles, e.g. changing their colors.

The service control means 102 of the virtual world manager apparatus 10 also displays information on a destination of a substitute in the default virtual space of the substitute which moved in the virtual world following a movement of the user in the real world. It should be noted that when clicking the information on the destination of the substitute in this condition, a user may jump to this destination of the substitute to join this virtual space.

The position detecting apparatus 11 comprises a user ID receiving means 111 which corresponds to the sensor 2 in FIG. 1 for reading a user ID from an ID card; a location ID judging means 112 which stores, as location ID data 114, positions in the real world in which user terminal apparatuses 12 are disposed and apparatus IDs of user terminal apparatuses 12 in the proximity of which the user ID receiving means 111 is disposed relating each other, for judging a position of a user in the real world identified by a user ID by referring to the location ID data 114; and a communication control means 113 for controlling transmission of data through the network 1.

The user terminal apparatus 12 comprises a communication control means 121 for controlling transmission of data through the network 1 including sending a user ID read by the sensor 2 from an ID card of the user and apparatus ID to the position detecting apparatus 11 responsive to a command from the position detecting apparatus 11, and sending photographed data by the camera 3 to the virtual world manager apparatus 10 responsive to a command from the virtual world manager apparatus 10; a service control means 122 for selecting a service of the network 1 responsive to a requirement from a user; a display means 123 for displaying an image of a virtual space and an image of a substitute of a user transmitted from the virtual world manager apparatus 10; and a command input means 124 such as a keyboard or mouse for inputting various commands such as moving command of substitutes, communication requiring command with another user, or log-in/log-out command to services of the network 1.

Figure 3A:
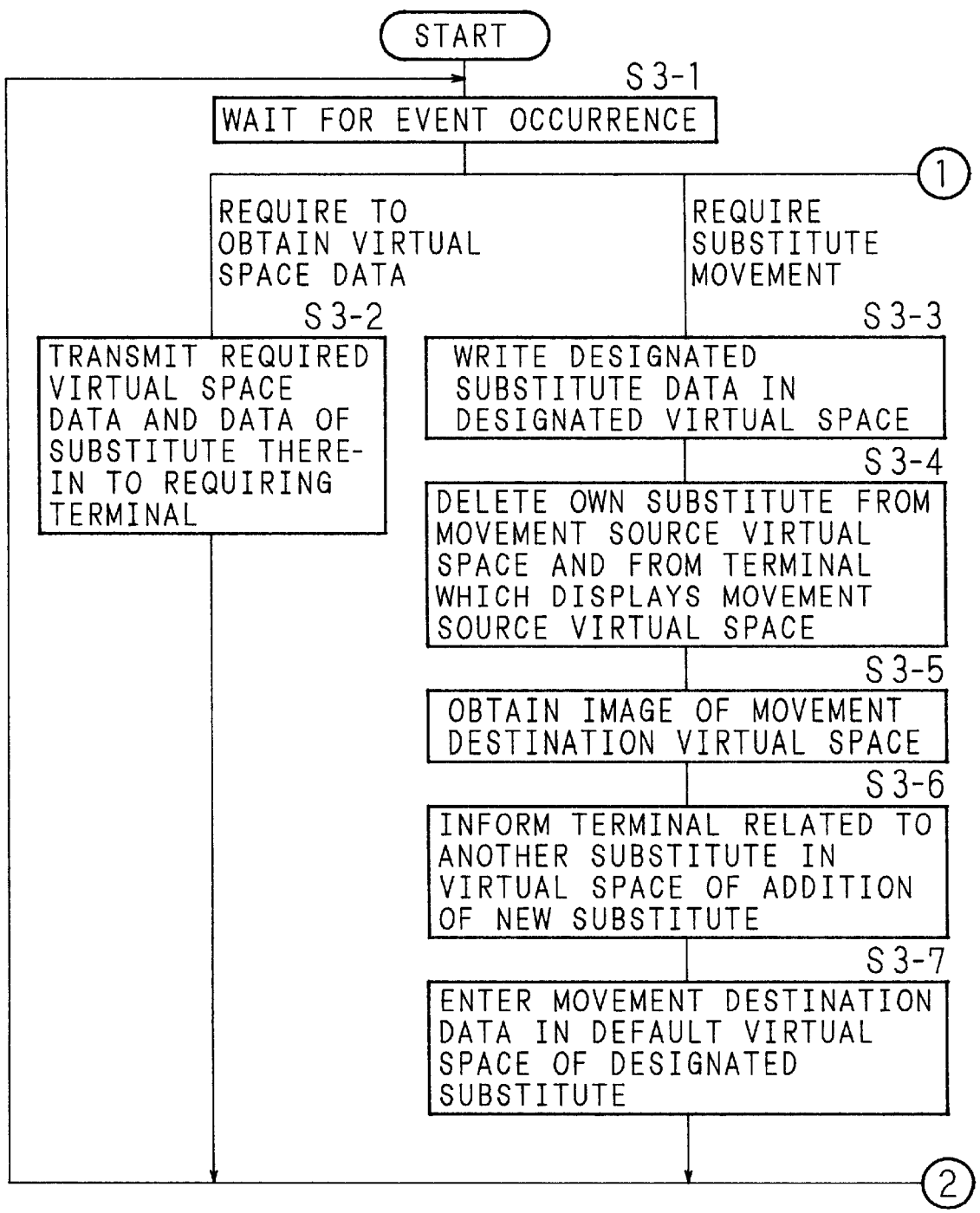
FIGS. 3A and 3B are flowcharts showing operations of a virtual world manager apparatus.
Figure 3B:
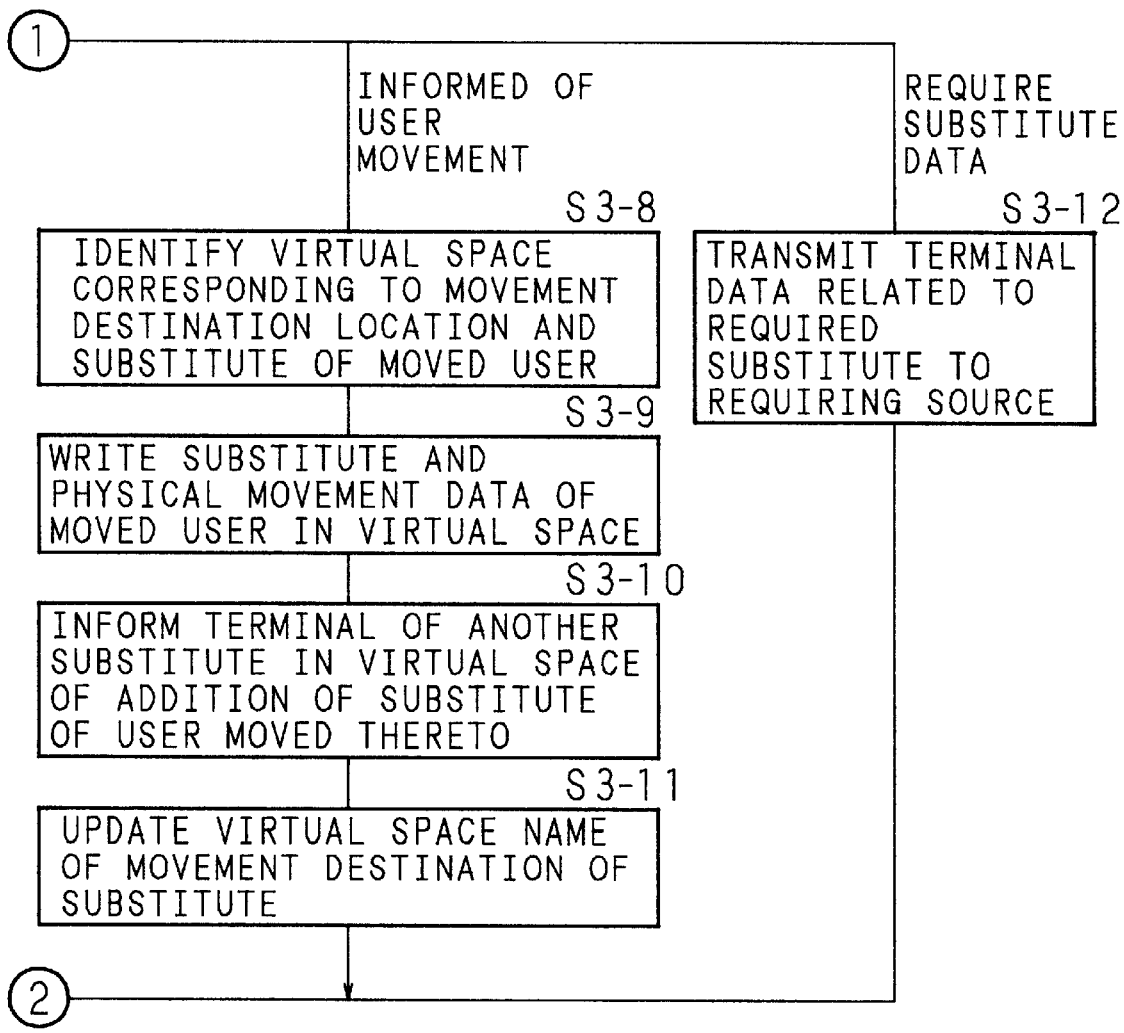

Next, operations of the virtual world manager apparatus 10 of the communication management apparatus of the present invention will be explained based on the flowcharts of FIG. 3A and FIG. 3B.

In case the virtual world manager apparatus 10 which waits for an event occurrence (Step S3-1) is required by a user terminal apparatus 12 to acquire virtual space data, the data such as an image of the required virtual space and an image of a substitute of a user joining this virtual space are transmitted to the requiring user terminal apparatus 12 (Step S3-2).

In case the virtual world manager apparatus 10 which waits for an event occurrence (Step S3-1) is required by a user terminal apparatus 12 to move the substitute, the apparatus 10 writes substitute data such as a user ID that corresponds to the substitute specified at the user terminal apparatus 12 in the virtual space data 108 to relate the data with the specified virtual space (Step S3-3), and deletes own substitute from the virtual space of the movement source and from other user terminal apparatuses displaying this virtual space (Step S3-4). The apparatus 10 obtains an image of the virtual space of the destination (Step S3-5), and informs user terminal apparatuses 12 related to other substitutes of users joining this virtual space of addition of the substitute of the user who newly joined (Step S3-6), and transmits the image of the substitute.

Next, the apparatus 10 enters the virtual space name of the destination of the substitute in the virtual space data 108 relating to the default virtual space name of a substitute that is designated to move (Step S3-7).

In case the virtual world manager apparatus 10 waits for an event occurrence (Step S3-1)is informed by the position detecting apparatus 11 that a user moved, identifies a virtual space name corresponding to the physical position and a substitute of the user who moved based on the physical position of the destination as well as the user ID of the user transmitted from the position detecting apparatus 11 (Step S3-8), and writes an image of this substitute and physical movement information of the user in the virtual space data 108 to relate the same to the corresponding virtual space name (Step S3-9).

Further, addition of a substitute which has moved to is informed to user terminal apparatuses 12 that correspond to substitutes of other users that are joining the virtual space to which the substitute has moved following a physical movement of the user (Step S3-10), and an image of the substitute is transmitted. At this time, an image indicating that this is a substitute which moved between virtual spaces following a physical movement of the user may be created and transmitted.

Then, the virtual space name entered in the virtual space data 108 in relation with the user ID of the identified substitute and the default virtual space name thereof is updated to the space name to which the user has moved (Step S3-11).

In case the virtual world manager apparatus 10 waits an event occurrence (Step S3-1) is required by a user terminal apparatus 12 of information on a substitute of a partner for the purpose of communication, information on a user terminal apparatus 12 related to a virtual space name of a destination of the user that is stored corresponding to a user ID of a substitute of the required partner is transmitted to the requiring user terminal apparatus 12 (Step S3-12). Also in a case in which the partner has physically moved, the user is able to communicate with the partner at a user terminal apparatus 12 of the destination by clicking the symbol of the substitute of the partner.

Figure 4A:
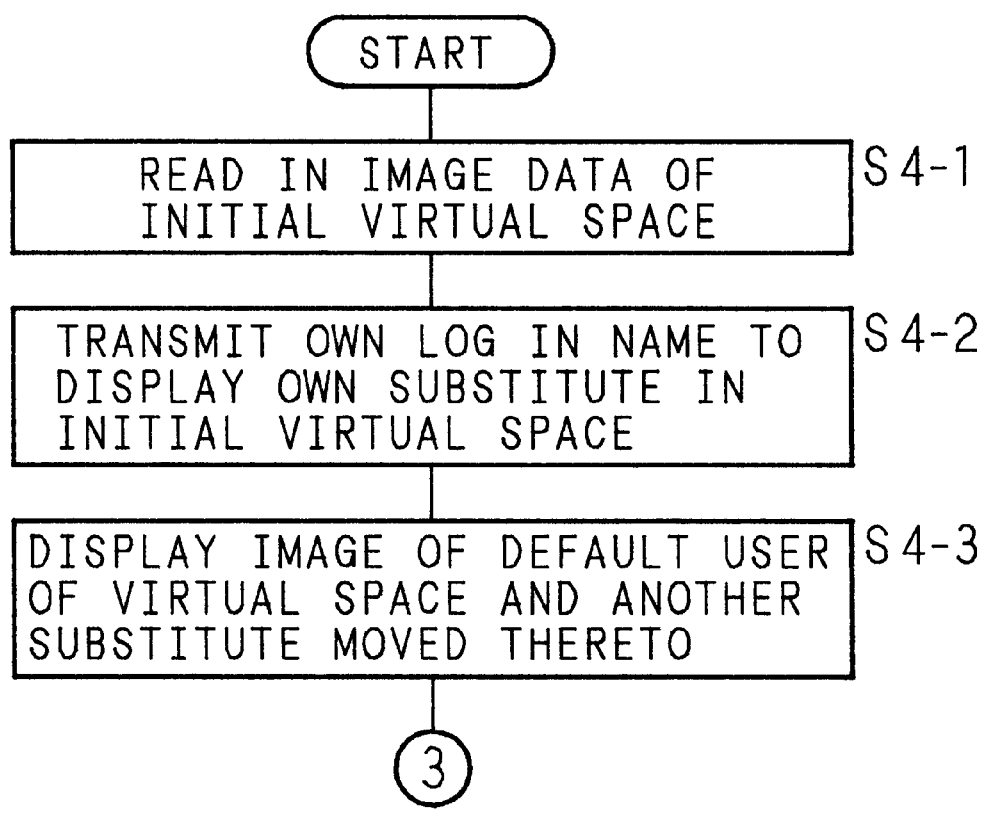
FIGS. 4A and 4B are flowcharts showing operations of a user terminal apparatus.
Figure 4B:
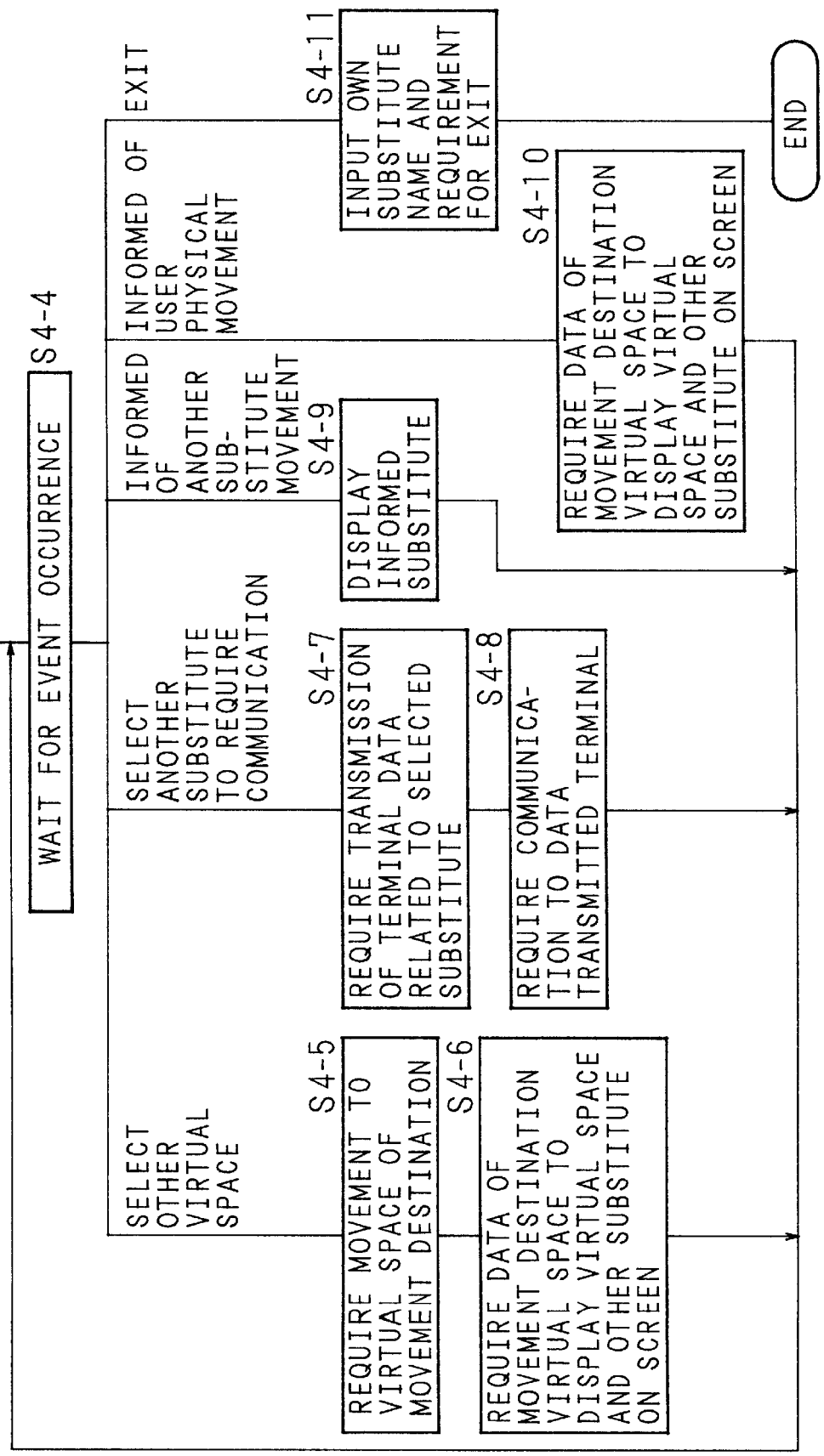

Next, operations of the user terminal apparatus 12 will be explained based on the flowcharts of FIGS. 4A and 4B and the screen display examples of FIGS. 5A and 5B.

In case the message exchange service in the virtual world is called for at a user terminal apparatus 12, image data of a virtual space that corresponds to this user terminal apparatus 12 is read from the virtual world manager apparatus 10 (Step S4-1). When the user logs in, the log-in name of the user is transmitted to the virtual world manager apparatus 10, and a substitute of this user is displayed in the virtual space on the user terminal apparatus 12 (Step S4-2).

Further, an image of the default user is displayed on the screen, and in case substitutes of other users are joining this virtual space, images of these substitutes are also displayed (Step S4-3).

Figure 5A:
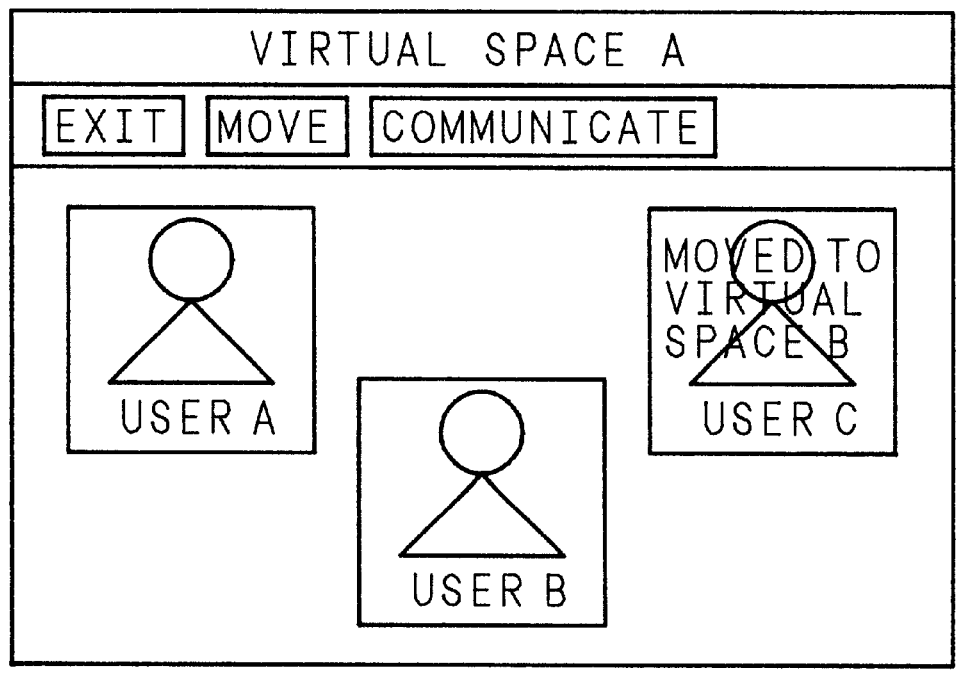
FIGS. 5A and 5B are diagrams showing examples of screen displays of the communication management apparatus of the present invention.

FIG. 5A is an example of an initial screen display of a user A for whom a virtual space A is the default virtual space. In the virtual space A, an image of a substitute of a user B who is joining the virtual space A is displayed in addition to a substitute of the user A, information on a destination of a substitute of a user C who has physically moved to another position at present, though the virtual space A being the default virtual space, are displayed.

In case a user selects another virtual space on the user terminal apparatus 12 which is waiting for an event occurrence (Step S4-4), the user terminal apparatus 12 required the virtual world manager apparatus 10 of the movement to the designated virtual space (Step S4-5). The user terminal apparats 12 also require the virtual world manager apparatus 10 of virtual space data of the destination so that the apparatus 12 displays an image of the virtual space transmitted from the virtual world manager apparatus 10 on the screen, and in case substitutes of other users are joining this virtual space, also displays images of these substitutes (Step S4-6).

In case the user selects a substitute of another user joining the virtual world to request for communication on the user terminal apparatus 12 that waits for an event occurrence (Step S4-4), the user terminal apparatus 12 requires the virtual world manager apparatus 10 to transfer information on a user terminal apparatus 12 related to the substitute selected by the user (Step S4-7) and the user terminal apparatus 12 requires the user terminal apparatus 12 identified by the information transferred from the virtual world manager apparatus 10 requested of communication (Step S4-8) so that communication with a partner is enabled through a user terminal apparatus 12 at a destination of the user even if the partner corresponding to the substitute has physically moved.

In case the user terminal apparatus 12 waits for an event occurrence (Step S4-4) is informed by the virtual world manager apparatus 10 that another substitute has moved to the virtual space which the user terminal apparatus 12 is joining, an image of the informed substitute is displayed in the virtual world (Step S4-9).

In case the user terminal apparatus 12 waits for an event occurrence (Step S4-4) is informed, for instance, by a user ID detected by the sensor 2, that the user who was joining the virtual world through the user terminal apparatus 12 has physically moved, the user terminal apparatus 12 requires the virtual world manager apparatus 10 of virtual space data corresponding to the physical position of the destination of the user, and displays on the screen an image of a virtual space which the user terminal apparatus 12 disposed at the destination is joining transmitted from the virtual world manager apparatus 10, and in case substitutes of other users are joining this virtual space, also displays images of these substitutes (Step S4-10).

Figure 5B:
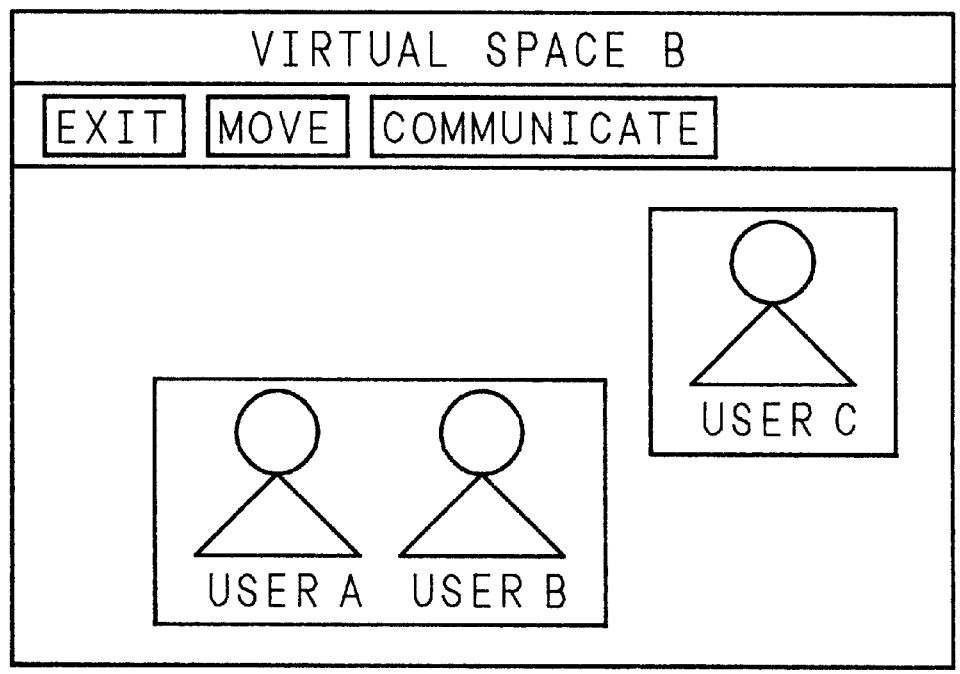

FIG. 5B is a diagram of an example of a screen display on a user terminal apparatus of user A who has physically moved to another position. The user A who moved to a user terminal apparatus joining a virtual space B is photographed by the camera 3 together with a user D who is present at this physical position, and an image of substitutes created from a picture of the both is displayed. An image of a substitute of a user C who is joining the virtual space B is also displayed.

At this time, an image of the substitute that moved following a physical movement of the user and an image of the substitute that moved through an operation by the user with the user terminal apparatus are displayed in different display styles such as changing their display colors.

In case that a user selects the exit button of the user terminal apparatus 12 which waits for an event occurrence (Step S4-4), and inputs his or her own substitute name and a command requesting for exit (Step S4-11), joining to the virtual world is terminated.

Figure 6:
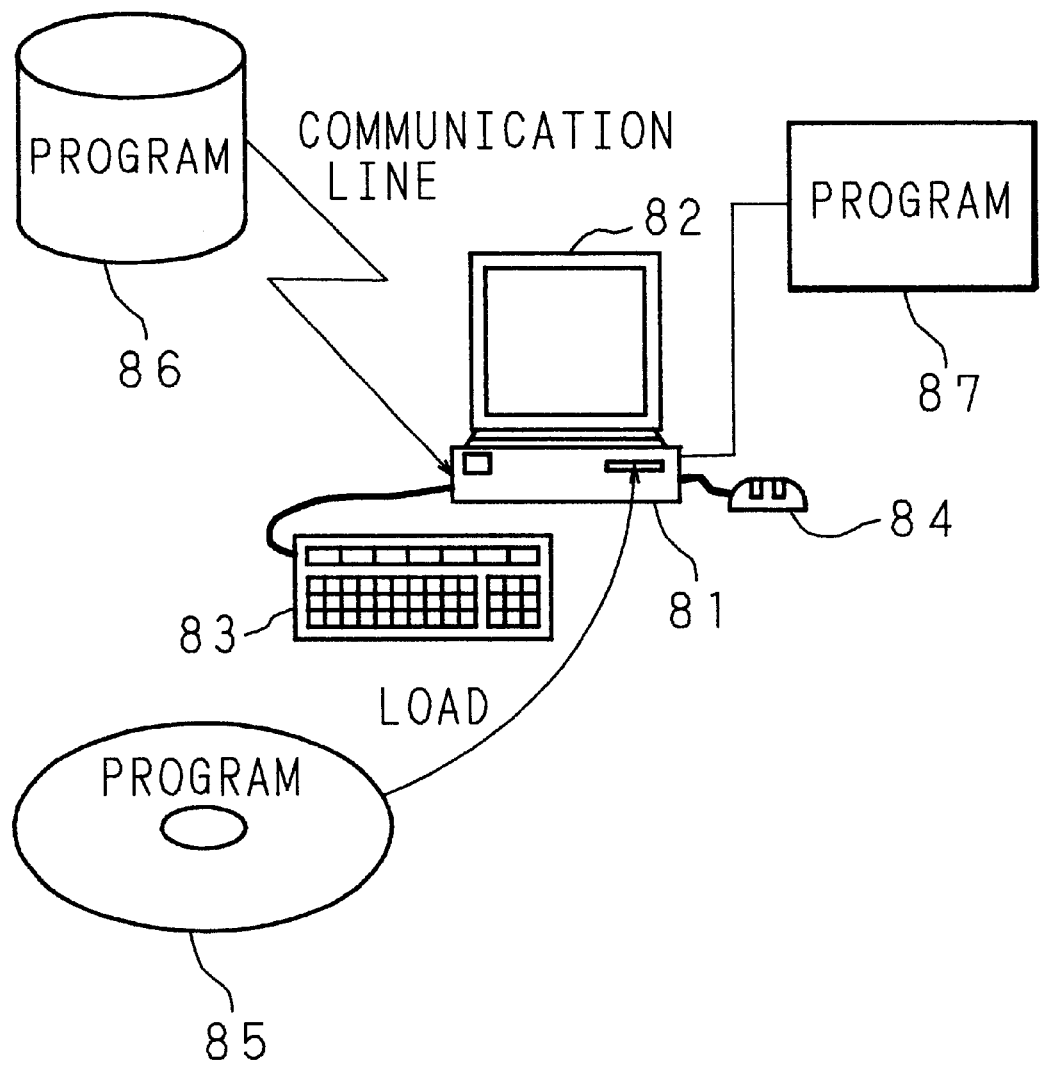
FIG. 6 is a schematic diagram showing a hardware arrangement for realizing the present invention.

FIG. 6 is a schematic diagram showing a hardware arrangement for realizing the present invention. The present hardware comprises a personal computer 81 as a processing device, a display 82 for displaying character data or the like, and a key board 83 and a mouse 84 as input devices. The personal computer 81 loads a program for performing the above-described processes either from a portable recording medium 85 such as a magnetic disk or CD-ROM, a memory 86 at the line destination which may be, for instance, provided at a center which enables either wireless or wired communication of programs with the personal computer 81, or a memory 87 on the side of the processing device such as a RAM or hard disk provided in the personal computer 81.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A communication management apparatus which makes a movement of a symbol of a communicating person in a virtual world follow a movement of the communicating person in the real world through a communication system in which the virtual world having a plurality of virtual spaces corresponding to the real world is constructed on a network to which a plurality of communication terminal apparatuses are connected, and the symbol of the communicating person to perform communication is operated to move from one virtual space to another virtual space, and the communication system enables exchange of messages between plural communicating persons who make their symbols join the same virtual space, said communication management apparatus comprising:

virtual space data management means for managing data specifying a virtual space and identification data of a communicating person that makes the symbol thereof join said virtual space;

correspondence management means for managing a position in the real world and data specifying a virtual space corresponding to the position relating each other;

position detecting means for detecting a position of a communicating person in the real world; and control means for controlling, in case the position detecting means detects that the communicating person moved to another position in the real world, the symbol of the communicating person to move to a virtual space corresponding to the other position in the real world.

2. The communication management apparatus according to claim 1, wherein a communication terminal apparatus at the default position of a symbol is defined, and wherein the control means comprises a means for displaying, in case a position of a symbol in the virtual world is moved to follow a movement of a communicating person in the real world, information of the destination of the communicating person on the communication terminal apparatus at the default position of the symbol of the communicating person.

3. The communication management apparatus according to claim 1, further comprising a terminal data management means for managing positions in the real world at which said plurality of communication terminal apparatuses are disposed corresponding to data for respectively identifying the plurality of communication terminal apparatuses, and wherein the control means further comprises a means for requiring, in case a symbol of which position in the virtual world is moved to follow a movement of a communicating person in the real world is requested to exchange a message by another symbol, communication of a communication terminal apparatus which is disposed in the real world at a position that corresponds the virtual space to which the symbol moved.

4. The communication management apparatus according to claim 2, further comprising a terminal data management means for managing positions in the real world at which said plurality of communication terminal apparatuses are disposed corresponding to data for respectively identifying the plurality of communication terminal apparatuses, and wherein the control means further comprises a means for requiring, in case a symbol of which position in the virtual world being moved to follow a movement of a communicating person in the real world is requested to exchange a message by another symbol, communication of a communication terminal apparatus which is disposed in the real world at a position that corresponds the virtual space to which the symbol moved.

5. The communication management apparatus according to claim 3, wherein the control means comprises a means for displaying, in case a position of a symbol in the virtual world is moved to another virtual space, the symbol on a terminal apparatus disposed at a position in the real world which corresponds to the virtual space to which the symbol is moved.

6. The communication management apparatus according to claim 4, wherein the control means comprises a means for displaying, in case a position of a symbol in the virtual world is moved to another virtual space, the symbol on a terminal apparatus disposed at a position in the real world which corresponds to the virtual space to which the symbol is moved.

7. The communication management apparatus according to claim 1, wherein the control means comprises a means for displaying a symbol which is moved through an operation and a symbol which is moved to follow a movement of a communicating person in the real world differently on a communicating terminal apparatus.

8. The communication management apparatus according to claim 2, wherein the control means comprises a means for displaying a symbol which is moved through an operation and a symbol which is moved to follow a movement of a communicating person in the real world differently on a communicating terminal apparatus.

9. The communication management apparatus according to claim 3, wherein the control means comprises a means for displaying a symbol which is moved through an operation and a symbol which is moved to follow a movement of a communicating person in the real world differently on a communicating terminal apparatus.

10. The communication management apparatus according to claim 4, wherein the control means comprises a means for displaying a symbol which is moved through an operation and a symbol which is moved to follow a movement of a communicating person in the real world differently on a communicating terminal apparatus.

11. The communication management apparatus according to claim 5, wherein the control means comprises a means for displaying a symbol which is moved through an operation and a symbol which is moved to follow a movement of a communicating person in the real world differently on a communicating terminal apparatus.

12. The communication management apparatus according to claim 6, wherein the control means comprises a means for displaying a symbol which is moved through an operation and a symbol which is moved to follow a movement of a communicating person in the real world differently on a communicating terminal apparatus.

13. The communication management apparatus according to claim 1, wherein the default virtual space where a symbol should join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

14. The communication management apparatus according to claim 2 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

15. The communication management apparatus according to claim 3 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

16. The communication management apparatus according to claim 4 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

17. The communication management apparatus according to claim 5 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

18. The communication management apparatus according to claim 6 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

19. The communication management apparatus according to claim 7 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

20. The communication management apparatus according to claim 8 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

21. The communication management apparatus according to claim 9 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

22. The communication management apparatus according to claim 10 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

23. The communication management apparatus according to claim 11 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

24. The communication management apparatus according to claim 12 wherein the default virtual space where a symbol is to join is defined, and wherein the virtual space data management means comprises a means for managing data respectively specifying the default virtual space of a symbol and a virtual space to which the symbol moves relating each other, and a means for updating data for specifying a virtual space to which the symbol moved each time the symbol moves, and wherein the control means comprises a means for displaying, in case a second symbol is made to join the default virtual space of a first symbol which moved to another virtual space from the default virtual space, information on the destination of the first symbol.

25. A recording medium readable by a computer which makes a movement of a symbol of a communicating person in a virtual world follow a movement of the communicating person in the real world through a communication system in which the virtual world having a plurality of virtual spaces corresponding to the real world is constructed on a network to which a plurality of communication terminal apparatuses are connected, and the symbol of a communicating person who is to perform communication is operated to move from one virtual space to another virtual space, and the communication system enables exchange of messages between plural communicating persons who make their symbols join the same virtual space, said recording medium comprising:

program code means for causing the computer to manage data specifying a virtual space and identification data of a communicating person that makes the symbol thereof join said virtual space;

program code means for causing the computer to manage a position in the real world and data specifying a virtual space corresponding to the position relating each other;

program code means for causing the computer to detect a position of a communicating person in the real world; and program code means for causing the computer to move the symbol of the communicating person to a virtual space corresponding to another position in the real world, in case it is detected that the communicating person moved to the position in the real world.

26. A communication management apparatus which makes a movement of a symbol of a communicating person in a virtual world follow a movement of the communicating person in the real world through a communication system in which the virtual world having a plurality of virtual spaces corresponding to the real world is constructed on a network to which a plurality of communication terminal apparatuses are connected, and the symbol of the communicating person to perform communication is operated to move from one virtual space to another virtual space, and the communication system enables exchange of messages between plural communicating persons who make their symbols join the same virtual space, said communication management apparatus comprising:

a virtual space data management unit managing data specifying a virtual space and identification data of a communicating person that makes the symbol thereof join said virtual space;

a correspondence management unit managing a position in the real world and data specifying a virtual space corresponding to the position relating each other;

a position detecting unit detecting a position of a communicating person in the real world; and a control unit controlling, in case the position detecting unit detects that the communicating person moved to another position in the real world, the symbol of the communicating person to move to a virtual space corresponding to the other position in the real world.

27. A recording medium readable by a computer which makes a movement of a symbol of a communicating person in a virtual world follow a movement of the communicating person in the real world through a communication system in which the virtual world having a plurality of virtual spaces corresponding to the real world is constructed on a network to which a plurality of communication terminal apparatuses are connected, and the symbol of a communicating person who is to perform communication is operated to move from one virtual space to another virtual space, and the communication system enables exchange of messages between plural communicating persons who make their symbols join the same virtual space, said recording medium comprising:

a program code unit causing the computer to manage data specifying a virtual space and identification data of a communicating person that makes the symbol thereof join said virtual space;

a program code unit causing the computer to manage a position in the real world and data specifying a virtual space corresponding to the position relating to each other;

a program code unit causing the computer to detect a position of a communicating person in the real world; and a program code unit causing the computer to move the symbol of the communicating person to a virtual space corresponding to another position in the real world, in case it is detected that the communicating person moved to the position in the real world.

28. A communication management system for moving a symbol representing a user from one virtual space to another virtual space as the user moves from one location to another location in the real world, comprising:

a position detector detecting a position of a user in the real world, the symbol of the user being displayed in a first one of the virtual spaces corresponding to the location of the user in the real world, and the user communicating with other users having symbols joined in the first virtual space; and a controller moving, when the position detector detects that the user moved to another position in the real world corresponding to a second one of the virtual spaces, the symbol of the user to the second virtual space, the user communicating with other users having symbols joined in the second virtual space.

29. A communication management method for moving a symbol representing a user from one virtual space to another virtual space as the user moves from one location to another location in the real world, comprising:

detecting a position of a user in the real world, the symbol of the user being displayed in a first one of the virtual spaces corresponding to the location of the user in the real world, and the user communicating with other users having symbols joined in the first virtual space; and moving, when said detecting detects that the user moved to another position in the real world corresponding to a second one of the virtual spaces, the symbol of the user to the second virtual space, the user communicating with other users having symbols joined in the second virtual space.

30. A computer-readable storage controlling a computer to move a symbol representing a user from one virtual space to another virtual space as the user moves from one location to another location in the real world, and comprising a process of:

detecting a position of a user in the real world, the symbol of the user being displayed in a first one of the virtual spaces corresponding to the location of the user in the real world, and the user communicating with other users having symbols joined in the first virtual space; and moving, when said detecting detects that the user moved to another position in the real world corresponding to a second one of the virtual spaces, the symbol of the user to the second virtual space, the user communicating with other users having symbols joined in the second virtual space.

* * * * *

UNITED STATES PATENT AND TRADEMARK OFFICE
CERTIFICATE OF CORRECTION

PATENT NO.    : 6,298,374 B1  
DATED         : October 2, 2001  
INVENTOR(S)   : Kazuo Sasaki et al.

Page 1 of 1

It is certified that error appears in the above-identified patent and that said Letters Patent is hereby corrected as shown below:

<u>Title page,</u>  
Item [56] References Cited: Change "6,006,460" to -- 6,006,254 --.  
Change 6,009,254" to -- 6,009,460 --

<u>Column 10,</u>  
Line 35, after "2" insert -- , --.  
Line 48, after "3" insert -- , --.  
Line 61, after "4" insert -- , --.

<u>Column 11,</u>  
Line 7, after "5" insert -- , --.  
Line 20, after "6" insert -- , --.  
Line 33, after "7" insert -- , --.  
Line 46, after "8" insert -- , --.  
Line 59, after "9" insert -- , --.

<u>Column 12,</u>  
Line 5, after "10" insert -- , --.  
Line 18, after "11" insert -- , --.  
Line 31, after "12" insert -- , --.

Signed and Sealed this

Second Day of April, 2002

*Attest:*

JAMES E. ROGAN  
*Attesting Officer*    *Director of the United States Patent and Trademark Office*